United States Patent
Mallet

[15] 3,698,279
[45] Oct. 17, 1972

[54] EXPANSION FASTENER
[72] Inventor: Emile Mallet, Paris, France
[73] Assignee: Expandet S.A., Paris, France
[22] Filed: Feb. 23, 1971
[21] Appl. No.: 118,140

[30] Foreign Application Priority Data
  Feb. 26, 1970  France.....................7006894

[52] U.S. Cl................................85/71, 85/37
[51] Int. Cl......F16b 13/04, F16b 19/08, F16b 39/28
[58] Field of Search............85/37, 31, 71, 84, 80, 82, 85/DIG. 2, 83, 75, 19; 151/41.73, 41.74, 7; 24/73 PF, 73 PM, 208 A, 217

[56] References Cited
UNITED STATES PATENTS

| | | | |
|---|---|---|---|
| 2,333,930 | 11/1943 | Hedstrom | 85/71 X |
| 2,912,031 | 11/1959 | Bensinger et al. | 151/41.73 |
| 3,213,746 | 10/1965 | Dwyer | 85/80 |
| 3,350,976 | 11/1967 | Topf | 85/37 |
| 3,431,813 | 3/1969 | Joynson | 85/83 |
| 3,481,242 | 12/1969 | Topf | 85/37 |

FOREIGN PATENTS OR APPLICATIONS 1,166,262  10/1969  Great Britain................85/84

Primary Examiner—Ramon S. Britts
Attorney—Karl F. Ross

[57] ABSTRACT

A blind fastener has an elongated body of polygonal cross-section with a plurality of longitudinally extending laterally projecting ribs formed at the corners of its sides. These ribs bite into the wall of a bore when the fastener is inserted therein. The short leg of each of a plurality of J-shaped arms is connected to the end of the fastener opposite its head and the long leg of each arm is formed with its own head so that on insertion of the fastener into the bore the short legs are bent out and the long legs lie against the blind side of a panel. The ribs are longitudinally ridged and the fastener is made of a deformable synthetic-resin material so that a screw inserted into the tubular body can expand it.

7 Claims, 9 Drawing Figures

PATENTED OCT 17 1972
3,698,279
SHEET 1 OF 2
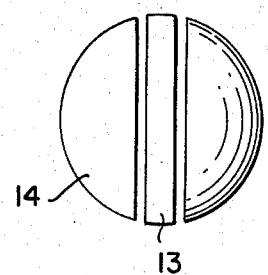
FIG. IA
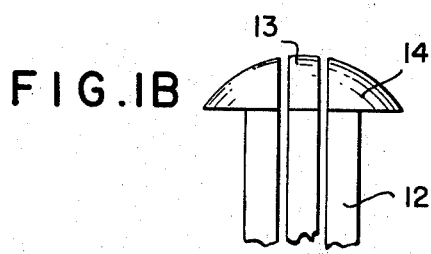
FIG. IB
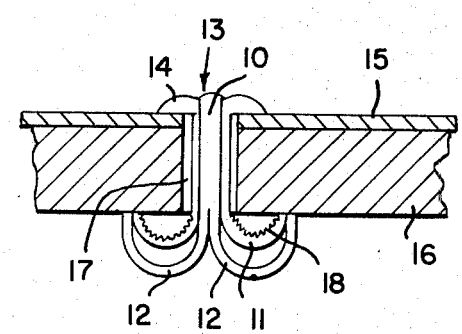
FIG. 2
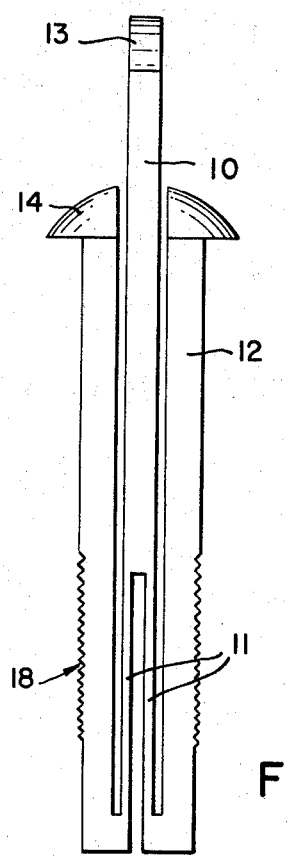
FIG. I
PRIOR ART
EMILE MALLET
*INVENTOR.*
BY  Karl F. Ross
ATTORNEY

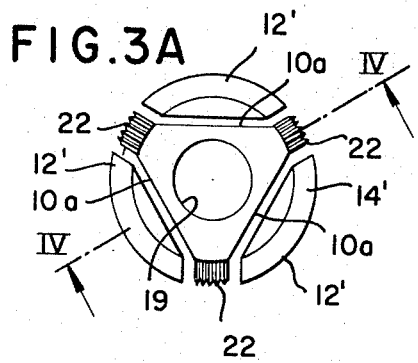
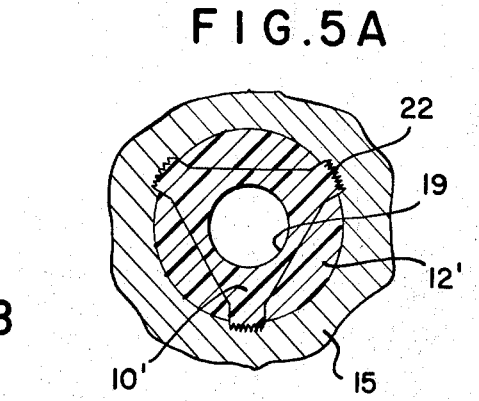
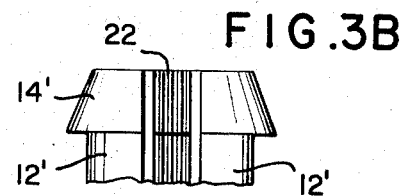
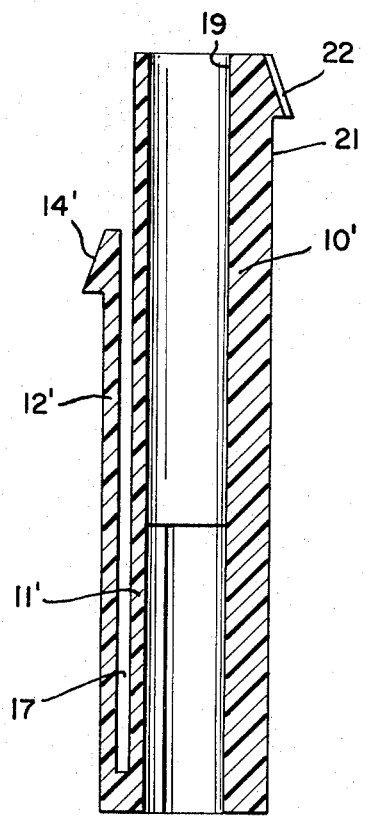
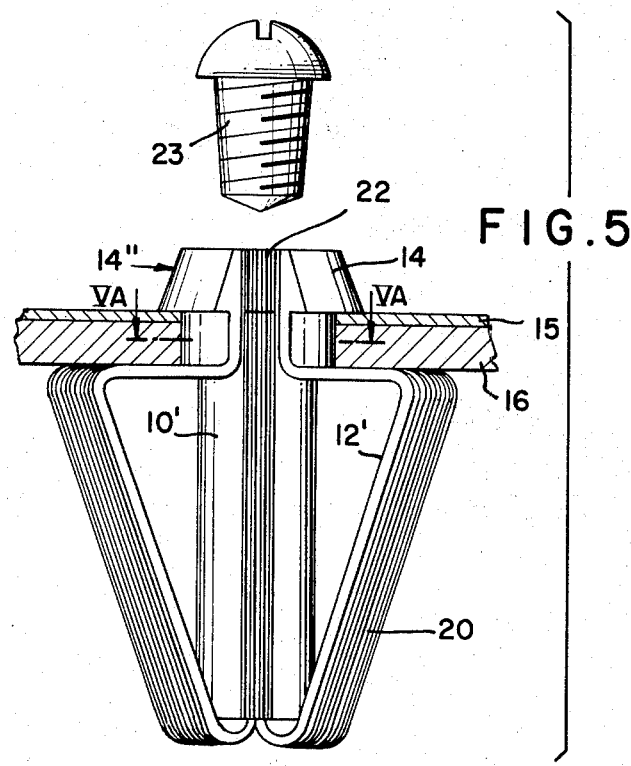

EXPANSION FASTENER

FIELD OF THE INVENTION

The present invention relates to a fastener adapted to be received in a bore. More particularly this invention concerns a fastener which is used to fasten an object to a panel, wall or the like which is accessible from only one side.

BACKGROUND OF THE INVENTION

It is often necessary to attach an object to a panel, wall or ceiling where it is impossible to find a stud or rafter, the thickness of the panel provides insufficient anchorage and no access is to be had to the other side of the panel or wall. To this end a variety of expansion or "blind" fasteners have been developed which are inserted through bores formed in the wall and are so made that they can be expanded on the blind or inaccessible side of the wall to form a solid mount for a picture, shelf or like object.

One such blind fastener comprises a flat elongated body formed at one end with a head and having the short leg of each of two opposite J-shaped arms attached to its other end. The long legs of these arms are provided at their free ends with respective heads that are not on a level with the head of the body. The legs and body together have a circular outline adapted to be received within a circular bore of the panel or wall. The fastener is inserted in the bore until the heads of the legs abut the surface of the panel, then the central body is driven in by a hammer or the like until it also abuts the panel. This deforms the legs outwardly causing the junctions of their legs or their knees to twist up and come to rest against the blind side of the panel, thereby clamping the fastener in place.

This type of fastener has two main disadvantages:

Firstly, it can only be used to hold something against the panel and the article so held cannot be changed or removed without destroying the fastener. Secondly, there is a tendency for the fastener to rotate about its own axis in the bore when subjected to torsion and thus the fastener or plug may not remain stationary as a screw is driven into it.

OBJECTS OF THE INVENTION

It is, therefore, an object of the present invention to provide an improved fastener.

Another object is the provision of a blind fastener which overcomes the disadvantages of the above-described prior-art type.

SUMMARY OF THE INVENTION

The above objects are obtained, according to the present invention, by a fastener having an elongated tubular body of polygonal cross-section formed at one end with a head and having a plurality of ribs extending longitudinally and projecting laterally from the outer corners between the sides of the body, these ribs being engageable with the wall of the bore in which the fastener is inserted. A plurality of angularly-spaced generally J-shaped deformable arms each have a short leg attached to the other end of the body and a long leg formed with a head and lying along a respective one of the sides. Each rib extends outwardly between a pair of the arms.

The fastener, according to the present invention, is formed with a central bore so that a screw or the like can be inserted into it to allow the article that is eventually fastened thereto to be removed without destroying the fastener. Advantageously this screw also serves to expand the deformable body and hold the fastener even tighter than otherwise possible in the bore.

The provision of laterally projecting ribs allows the fastener to be inserted in a bore of smaller diameter than the diameter of an imaginary cylinder defined by these ribs. In this manner, the ribs can bite into the edges of the bore and very effectively prevent rotation of the fastener therein. Since the body is a single unit, a plurality of these ribs, at least three, all simultaneously engage the wall of the bore and all are in direct force-transmitting relationship with one another.

An essential characteristic of the invention is that the tubular plug body is outwardly expansible, upon forcible introduction of a screw therein and is polygonal with each longitudinally extending surface being integrally and unitarily continued into a respective J-shaped arm reaching parallel to the tubular body; in this usage, "polygonal" means at least three longitudinal sides and, preferably, a cross-section corresponding to a regular polyhedron.

DESCRIPTION OF THE DRAWING

The above and other objects, features and advantages of the invention will become apparent from the following description, reference being made to the accompanying drawing, in which:

FIG. 1 is a side-elevational view of a prior-art fastener;

FIG. 1A is a top view of the fastener of FIG. 1;

FIG. 1B is a side-elevational view of the upper end of the fastener of FIG. 1, shown with the central head in the down position;

FIG. 2 is a sectional view through a panel with the fastener of FIGS. 1, 1A and 1B;

FIG. 3A is a top view of the fastener according to the present invention;

FIG. 3B is a side-elevational view of the head of the fastener of FIG. 3A;

FIG. 4 is a side-elevational view of the fastener of this invention;

FIG. 5 is a side view showing the fastener of the present invention inserted in a panel; and FIG. 5A is a section taken along line VA — VA of FIG. 5.

SPECIFIC DESCRIPTION

As seen in FIG. 1–2, a prior-art fastener has a flat body 10 formed on one end with a head 13. Extending from the lower end of the body 10 are the short legs 11 of a pair of J-arms 11, 12 having long legs 12 extending back along the body and formed at their upper ends with respective heads 14. The long legs 12 are of substantially greater thickness than the short legs 11 so that, as shown in FIG. 2, when the central head 13 is driven in, the two legs 12 bend back to contact the blind side of a panel 16 and thereby hold a sheet 15 thereagainst, the panel and the sheet both being formed with a circular bore 17. The legs 12 are formed with transverse grooves 18 to facilitate their flexing.

FIGS. 3A, 3B, 4, 5 and 5A show the fastener according to the present invention. A body or plug 10' of triangular crossasection has flat sides 10a with, extending from its corners, laterally projecting ribs 21. The body 10' is tubular with a central throughgoing bore 19. It is formed at its upper end with a head constituted by three laterally projecting tabs:

Three J-arms 12', 14' each have a short leg 11' extending down from the lower end of the body 10' in line with a respective side 10a and a long leg 12' extending back along the body 10'. The legs 12' are around twice as long as the legs 11' and around the same length as the body 10'. Each leg 12' is formed at its upper end with a small tab 14' which together with the tabs 22 form a head 14''. The tabs 22, legs 11' and 12' and ribs 21 are all longitudinally ridged as shown at 20.

The fastener, according to this invention, is used in the conventional manner; the plug is inserted into a hole and hammered in place. The object to be mounted on the panel is then attached by the screw driven into the plug. However, the novel structure of the plug of the present invention given new hitherto unobtainable advantages. As best seen in FIG. 5A, the fastener is adapted to be inserted into a bore 17 of diameter somewhat smaller then the imaginary cylinder tangent to the edges of the ribs 21. In this manner these ribs 21 bite into the sides of the bore 17 with their ridges 20, thereby making it impossible for it to turn therein. At the same time, if a screw such as shown at 23 in FIG. 5 is threaded into the bore 19, some expansion of the deformable sythetic-resin fastener takes place which expands it and fixes it even more solidly in the bore. The longitudinal ridges 20 along the legs 12' also serve to prevent rotation since these legs 12' lie flat against the blind side of the panel 16. In the prior-art fastener, the legs 11 and 12 merely bend back to form a knee engaging this side of the panel.

If both sides of the panel 16 are accessible, it is possible to insert the screw 23 through the fastener from the back to securely block it in position. The fastener is molded of deformable synthetic-resin material in a single operation and can have four, five or many sides, if desired.

I claim:

1. A fastener assembly receivable in a bore and comprising:
   an elongated continuous tubular body of closed uniform polygonal cross-section having at least three sides and composed of an elastically expandible material;
   a head at one end of said body and formed unitarily therewith;
   at least three axially extending ribs projecting laterally from the corners of said body and engageable with the wall of said bore;
   at least three angularly spaced generally J-shaped deformable arms each having a short leg attached to the other end of said body between said ribs and a long leg of lesser length than said body formed with an enlarged head and lying along a respective one of said sides, each rib extending outwardly between and laterally beyond a pair of said arms when said arms are pressed against said body portions of each of said arms being laterally outwardly deformed upon driving said body into said bore; and
   a screw received in said body at said head for expanding said body against said wall.

2. A fastener assembly defined in claim 1 wherein said legs are all parallel to said body.

3. The fastener assembly defined in claim 2 wherein said ribs are longitudinally ridged.

4. The fastener assembly defined in claim 3 wherein said body is triangular in cross-section.

5. The fastener assembly defined in claim 4 wherein said body is made of synthetic resin.

6. The fastener assembly defined in claim 5 wherein said long legs lie within a cylinder tangent to the periphery of said ribs.

7. A one-piece fastener receivable in a hole in a wall, comprises a tubular expandable polyhedral body of synthetic resin having at least three angularly spaced longitudinally extending surfaces, respective deformable arms unitary with said body and continuing each of said surfaces while being turned back parallel thereto, said arms being of lesser length than said body, respective ribs extending longitudinally along said body and projecting laterally beyond said arms when the latter are pressed against said body, and respective enlarged formations on the free end of said arms engageable with said wall for retaining said free ends upon driving of said body into said hole, portions of each of said arms being laterally outwardly deformed upon said driving.

* * * * *